June 16, 1964 W. R. ALVIN ETAL 3,137,606
METHOD OF FABRICATING AN INFLATABLE AND FOLDABLE UMBRELLA
Filed Sept. 28, 1962
2 Sheets-Sheet 1
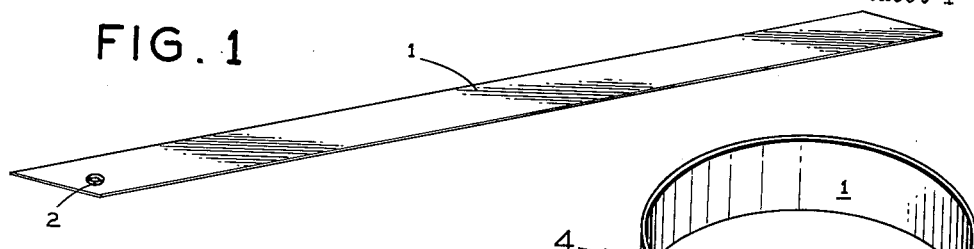
FIG. 1
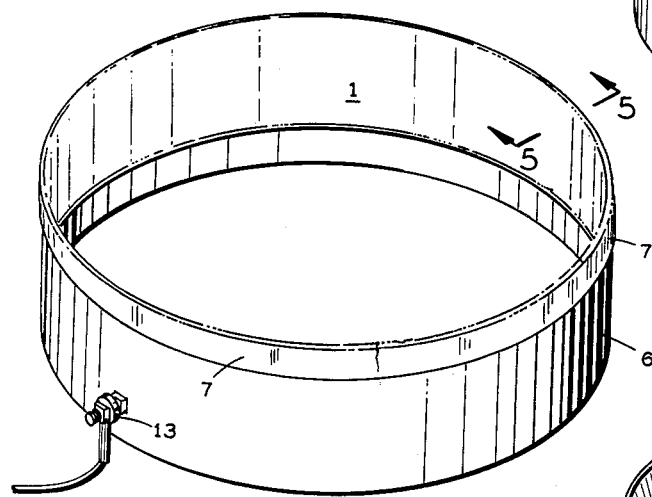
FIG. 2
FIG. 4
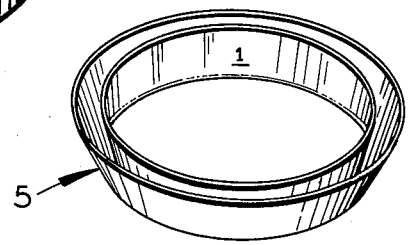
FIG. 3
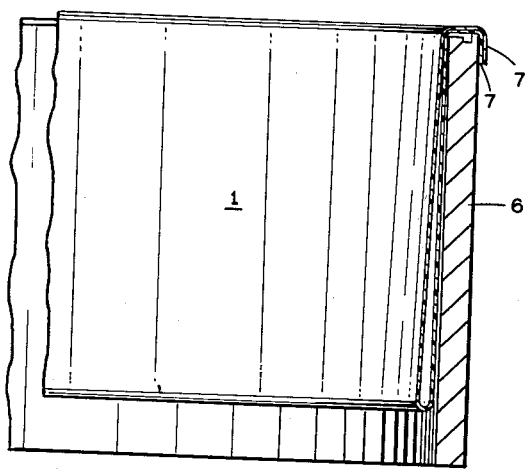
FIG. 5
INVENTORS
WILLIAM R. ALVIN
DON A. MAYERSON
BY June 16, 1964 W. R. ALVIN ETAL 3,137,606
METHOD OF FABRICATING AN INFLATABLE AND FOLDABLE UMBRELLA
Filed Sept. 28, 1962 2 Sheets-Sheet 2

INVENTORS
WILLIAM R. ALVIN
DON A. MAYERSON
BY

United States Patent Office 3,137,606
Patented June 16, 1964

3,137,606
METHOD OF FABRICATING AN INFLATABLE AND FOLDABLE UMBRELLA
William R. Alvin, 1559 Trevino Ave., Coral Gables, Fla., and Don A. Mayerson, 1145 NE. 177 Terrace, North Miami Beach, Fla.
Filed Sept. 28, 1962, Ser. No. 226,984
2 Claims. (Cl. 156—273)

This invention in general relates to umbrellas and more particularly to an umbrella which may be compactly stored and readily inflated for use.

Conventional umbrellas are inherently bulky and often unavailable in emergencies and previous inflatable umbrellas were objectionable because of high cost complex construction and relatively bulky shape when deflated for storage and those structures dependant upon adhesive sealed seams often failed to hold air when inflated.

The present invention and the method of constructing same overcomes the above objections and disadvantages by the provision of an inflatable umbrella comprising two main elements formed from sheet plastic material and welded together into a predetermined disc-like shape by electro-thermal means and including an inflation valve for inflating same by mouth into a full size semi-rigid circular umbrella, and when deflated capable of being folded and stored in a case substantially the same size as that used for spectacles, which construction is a principal object of the invention.

Another object of the invention is the provision of a heat sealed umbrella made from sheet plastic material forming a torus ring with a peripheral junction with the outer edge of a circular disc of like material having a central handle means whereby the inflation of the torus ring will urge the disc into a substantially diaphragm-like form for manual use when held by a central handle means.

A further object of the invention is the formation of a heat-welded peripheral seam closure for a torus ring formed from thermo-plastic sheet and the simultaneous heat-welding of the outer edge of a circular plastic disc to said closure.

A further object of the invention consists of a method for the pre-forming of a planar linear sheet of thermo-plastic material into a torus ring shape by means of a cylindrical metal form serving as one electrode of a dielectric heating means and having one edge of a predetermined shape for welding the closure of the torus ring thereon when said edge is placed into close proximity with a planar electrode with the said peripheral edges therebetween and the said electrodes energized by high frequency electric means.

These and other objects of the invention are described and shown in the following specification and drawings, in which:

FIG. 1 is a perspective view of a rectangular sheet of plastic material required for one element of the umbrella.

FIG. 2 is a perspective view of the element shown in FIG. 1 with the ends thereof welded together forming a band.

FIG. 3 is a perspective view of the element shown FIG. 2 after forming into a circular collar.

FIG. 4 is a perspective view of a cylindrical electric heater electrode with the element shown FIG. 3 formed over one edge thereof.

FIG. 5 is an enlarged cross sectional view taken through section line 5—5 FIG. 4.

Figures 7, 8, 10:
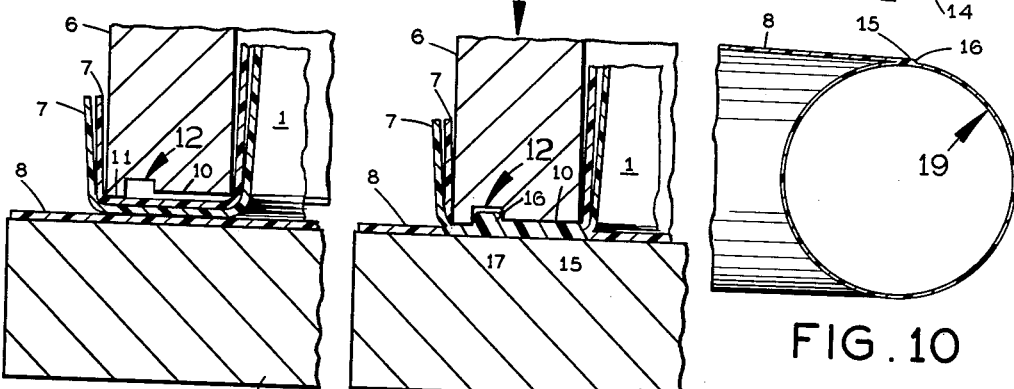
FIG. 7 is a fragmentary enlarged cross sectional view of the welding electrodes shown FIG. 6 with elements to be welded therebetween.

FIG. 8 same as FIG. 7 after the application of high frequency electric energy to said electrode showing the welded and sealed junction of the elements shown FIG. 7.

Figure 9:
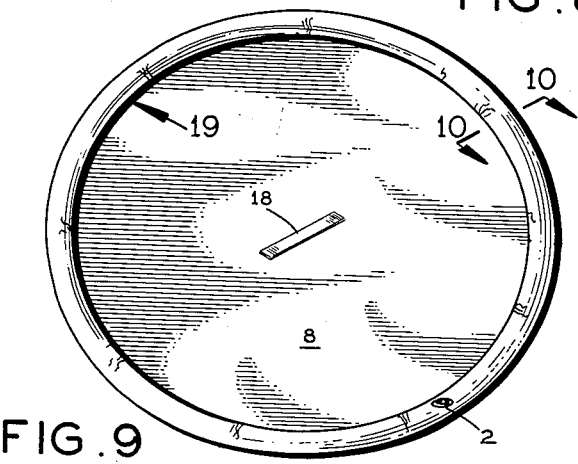

FIG. 9 is a perspective view in reduced scale of the under side of the umbrella when inflated.

FIG. 10 is an enlarged cross sectional view taken through section line 10—10, FIG. 9.

Figure 11:
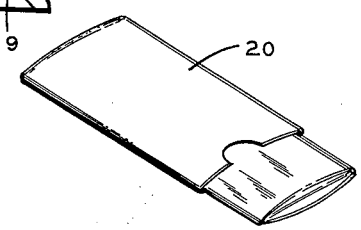

FIG. 11 is a perspective view of a holder containing the deflated folded umbrella shown FIG. 9.

The inflated umbrella hereinafter described comprehends the use of plastic sheet material having a predetermined degree of elasticity and having properties capable of heat welding for forming leakproof seams.

Although a wide variety of sheet materials are available for this use, this particular embodiment is intended to be formed from polyvinyl chloride, one variety of which is known as Vinylite, and having a thickness in the order of .004 to .006 inch and an elongation percentage of between 200 and 450 depending upon the degree of included plasticizer.

Referring to FIGS. 1 and 2 a rectangular sheet 1 of polyvinyl chloride of predetermined dimensions has sealed therein a conventional check valve 2 hereinafter described.

The opposite ends of sheet 1 are thermally lap welded together at a junction 3 by well known dielectric heating means, not shown, into a circular band 4.

The band 4 shown FIG. 2 is then formed by well known means into a circular collar 5 having a uniform U-shaped cross section. The collar is then placed within a cylindrical metal electrode 6 and the dual outer margin 7—7 thereof is formed outward and over one edge of the electrode as shown in FIG. 5.

Figure 6:
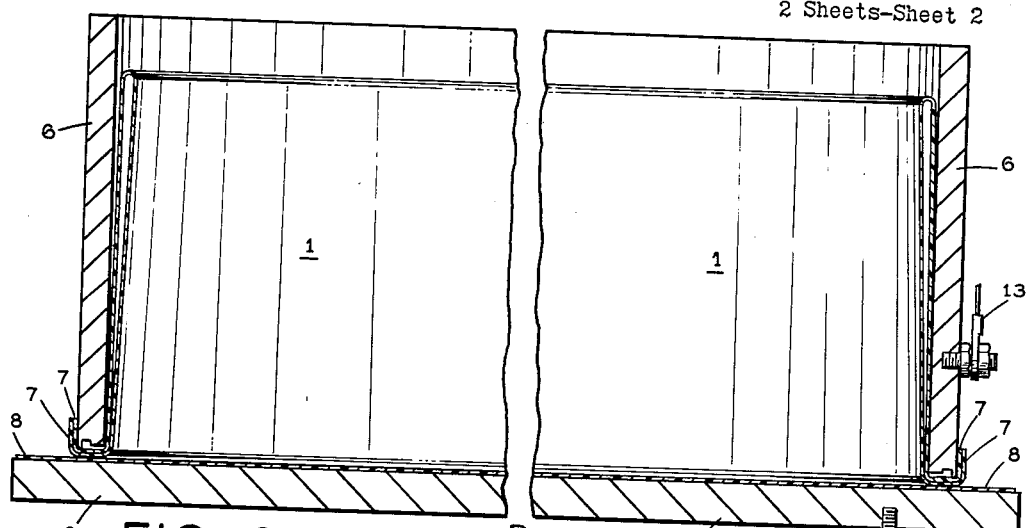
FIG. 6 is a fragmentary cross sectional view of the electrode positioned for welding two elements of the umbrella into a common seam.

A circular disc 8 of like plastic material having a diameter somewhat larger than electrode 6 is placed upon a planar electrode 9. The electrode 6 and the pre-formed element 1 as shown in FIG. 4 is inverted and placed upon the disc 8 in concentric relation therewith on the planar electrode 9 as shown FIG. 6.

Referring to the enlarged cross sectional view FIG. 7 the circular edge of electrode 6 has a main welding sealing area 10 and a narrow tear seal area 11, separated by a clearance groove 12 as shown.

When the terminals 13 and 14 are connected to a source of high frequency electric energy and a predetermined downward pressure P is axially applied to electrode 6 and the electrodes energized for a predetermined period then the margins 7—7 of element 1 and the outer marginal portion of disc 8 will be welded together around the area 15 with a circular bead 16 and a thin circular tear area 17 as shown. The outer margins 7—7 of element 1 and the outer margin of disc 8 may be torn from the new welded assembly of elements 1 and 8 around the periphery of the area 17. The bead 16 will perform the function of reinforcing the welded seam and insure a leakproof seal around the periphery of the umbrella.

A strap 18 of like material is welded at its opposite outer ends in the central area of disc 8 on the under side thereof, and serves as a handle for manually holding the umbrella when inflated.

In operation, and assuming the now formed tube 19, having a toroidal outer surface, is inflated by mouth, by blowing into the normally one way check valve 2, which will extend the disc 8 into a yieldable planar position whereby the entire assembly may be conveniently held by strap 18 from the underside thereof, permitting the disc to assume an approximate conical shape for shedding rainfall over the tube 19, as illustrated in FIG. 10.

The tube 19 may be deflated by laterally deforming valve 2 and the entire umbrella folded in a package which may be inserted in a case 20 which may be substantially the same size as a case for spectacles.

Although inflation by mouth is convenient, it is now apparent that a conventional carbon dioxide cartridge may be used for inflation as well as a small reciprocating pump with the disadvantage of a sacrifice in space requirements.

It is apparent that other forms of holding means may be substituted for the strap 18, such as a light weight shaft or other collapsible means.

Certain other modifications to the above construction using the features described are intended to come within the scope of the appended claims.

Having described our invention, we claim:

1. A method for fabricating an inflatable and foldable umbrella consisting of a first step of sealing a check valve in a rectangular sheet of plastic material of uniform thickness, and a second step of joining opposite ends of said sheet by thermo-welding means forming an endless belt, and a third step of folding said belt around its midsection into a collar having a U-shaped cross section, and a fourth step of placing said collar around the inner periphery of a hollow cylindrical electrode and forming both the inner and outer edge portions of said collar over one edge of said electrode, and a fifth step of placing a disc of said material on a planar surface of a second electrode, and moving said electrodes together under predetermined pressure with said outer margin of said disc into contact with the edge portions of said collar, and a sixth step of energizing both said electrodes with high frequency electric energy and welding both said edge portions and said collar and said margin of said disc together in an endless junction corresponding to the said one edge of said circular electrode for forming an inflatable umbrella in which said collar will assume a substantially toroidal shape when inflated through said valve and said disc forming a cover on one side of said inflated collar.

2. A method for fabricating an inflatable and foldable umbrella consisting of a first step of sealing a check valve in an endless belt of a sheet plastic material of uniform thickness and predetermined width, and a second step of folding said belt around its midsection into a collar having a U-shaped cross section, and a third step of placing said collar around the inner periphery of a hollow cylindrical electrode and forming both the inner and outer edge portions of said collar over one edge of said electrode, and a fourth step of placing a disc of said material on a planar surface of a second electrode, and moving said electrodes together under predetermined pressure with said outer margin of said disc into contact with the edge portions of said collar, and a fifth step of energizing both said electrodes with high frequency electric energy and welding both said edge portions and said collar and said margin of said disc together in an endless junction corresponding to the said one edge of said circular electrode for forming an inflatable umbrella in which said collar will assume a substantially toroidal shape when inflated through said valve and said disc forming a cover on one side of said inflated collar.

References Cited in the file of this patent

UNITED STATES PATENTS

| | | |
|---|---|---|
| 2,649,392 | Marshall | Aug. 18, 1953 |
| 2,768,107 | Magid | Oct. 23, 1956 |
| 2,810,391 | Jones | Oct. 22, 1957 |
| 2,827,909 | Platzke | Mar. 25, 1958 |
| 3,026,233 | Scholl et al. | Mar. 20, 1962 |
| 3,028,576 | Gerard | Apr. 3, 1962 |
| 3,044,920 | Dewar | July 17, 1962 |